United States Patent [19]
Hurst

[11] Patent Number: 4,794,695
[45] Date of Patent: Jan. 3, 1989

[54] EASY LOADING HERBAGE TRIMMER

[76] Inventor: Hubert L. Hurst, 6908 Greenway Dr. N., Mobile, Ala. 36608-4215

[21] Appl. No.: 140,497

[22] Filed: Jan. 4, 1988

[51] Int. Cl.⁴ .................................................. A01G 3/06
[52] U.S. Cl. ........................................ 30/276; 30/347; 56/12.7
[58] Field of Search ............... 30/276, 347; 56/12.7, 56/295

[56] References Cited

U.S. PATENT DOCUMENTS

| | | | |
|---|---|---|---|
| 4,062,115 | 12/1977 | Lee | 30/276 |
| 4,095,338 | 6/1978 | Naohiko et al. | 30/276 |
| 4,112,653 | 9/1978 | Ballas et al. | 56/12.7 |
| 4,114,269 | 9/1978 | Ballas | 30/276 |
| 4,236,311 | 12/1980 | Mitchell | 30/276 |
| 4,366,622 | 1/1983 | Lombard | 30/276 |
| 4,419,822 | 12/1983 | Harris | 30/276 |
| 4,476,632 | 10/1984 | Proulx | 30/276 |
| 4,584,771 | 4/1986 | Tillotson | 30/276 |
| 4,630,371 | 12/1986 | Graham | 56/12.7 X |

Primary Examiner—Donald R. Schran
Assistant Examiner—Michael D. Folkerts
Attorney, Agent, or Firm—Norman B. Rainer

[57] ABSTRACT

An improvement is provided in a motor drive rotary herbage trimmer whereby a spool that carries a supply of a flexible cord is easily inserted into the trimmer or removed therefrom. The improvement involves a receptacle mounted to the drive shaft of the motor and adapted to hold the spool, a closure member adapted to seal the open bottom of the receptacle, coupling devices which cause the closure member to interlock with the receptacle by turning movement, and a holding bar which can be used to hold the receptacle motionless while the closure member is turned.

2 Claims, 3 Drawing Sheets

EASY LOADING HERBAGE TRIMMER

BACKGROUND OF THE INVENTION

This invention relates to rotary edgers, trimmers or the like which employ a flexible cord for cutting grass, weeds and other vegetation in a flail-like manner. Typically these cutters are used in areas in which vegetation is somewhat inaccessible to apparatus employing rigid cutting blades or where there is a risk that rigid blades may throw as projectiles items concealed by the vegetation.

Generally, such devices include a head member suspended from an upwardly disposed elongated handle. The head member contains an electric motor or gasoline engine which rotates a downwardly directed shaft at high speed. A cutting cord is associated with the shaft, and extends perpendicularly therefrom by centrifugal force to define a cutting plane. The cord is fabricated of a material such as nylon monofilament which is flexible to the extent that it is substantially incapable of causing damage or injury when impacted against persons, animals, trees, etc.

Most embodiments of such trimmer devices include means for detachably holding a supply of cord so that the rotated extremity of the cord may be replaced after wear or breakage resulting from impact during use. The supply of additional cord is generally a continuous coiled length stored upon a flanged spool of standardized construction. Fresh cord may be tangentially drawn from the spool to restore the working length, namely the length between the spool and the free extremity of the cord.

In the course of normal usage, the means for securing the spool to the head member may become jammed by fragments of vegetation or encrusted by accumulated particles of vegetation, causing difficulties in removing or replacing the spool with bare hands. Also, the means for securing the spool to the head member may become loosened due to vibration of the head member or contact of the head member with immobile objects. Such loosened parts of the head member may become lost, or thrown as projectiles. Because the particles of vegetation encrusting the head member may be of an irritating or allergenic variety, such as poison ivy, it is desirable to minimize bare-handed contact with spools during their replacement.

It is accordingly a primary object of the present invention to provide a rotary cord herbage trimmer in which the spool that holds the stored cord may be quickly and easily removed or replaced.

It is another object of this invention to provide a rotary cord herbage trimmer as in the foregoing object having means for safely securing said spool.

It is a further object of the present invention to provide a rotary cord herbage trimmer of the aforesaid nature in which minimal handling is necessary in removing or replacing the spool.

These objects and other objects and advantages of the invention will be apparent from the following description.

SUMMARY OF THE INVENTION

The above and other beneficial objects and advantages are accomplished in accordance with the present invention by an improvement in a rotary cord herbage trimmer comprising a head member having a housing which defines a downwardly opening enclosure, a motor mounted adjacent the upper extremity of the housing, and a drive spindle emergent from said motor and directed downwardly into said enclosure, said improvement comprising:

(a) a spool-accommodating receptacle symmetrically configured about a center axis of rotation and comprised of a circular cylindrical inner sidewall axially centered upon said axis and defining a central space, a circular cylindrical outer sidewall coaxially aligned with said inner sidewall and defining therewith an annular space adapted to confine a cord-carrying spool, a top portion having an upper surface, and a lower surface from which said sidewalls are perpendicularly emergent, said sidewalls terminating in circular perimeter edges lying in substantially coplanar disposition, first coupling means disposed within said central space, a channel penetrating said outer sidewall in a direction substantially perpendicular to said axis, a recess located in said outer sidewall and elongated in a direction parallel to said axis, and means associated with said upper surface for attaching the receptacle to said spindle in coaxial alignment therewith and within said enclosure, (b) a closure member symmetrically configured about a center axis, having a bottom surface, and a top surface laterally bounded by a circular periphery having a diameter substantially equal to the diameter of said outer sidewall, second coupling means associated with said top surface and configured to rotationally engage said first coupling means, causing said closure member to interlock with said receptacle in coaxial alignment with said axis of rotation while rendering said spool immobile with respect to said receptacle, and means associated with said bottom surface to facilitate manual rotation of said closure member with respect to said receptacle to achieve said interlocking, and (c) holding means adapted to releasibly engage said recess for the purpose of preventing rotation of said receptacle while said closure member is manually rotated to achieve or release said interlocking.

In preferred embodiments of the trimmer, the receptacle and closure member may each be of substantially monolithic construction, fabricated of engineering grade thermoplastic polymer by a molding operation. The means associated with the closure member for manual rotation may be either a recess which accommodates a wrench device, or an upraised structure which facilitates gripping to receive manually applied torque force. The holding means may be a member pivotably positioned within said enclosure.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
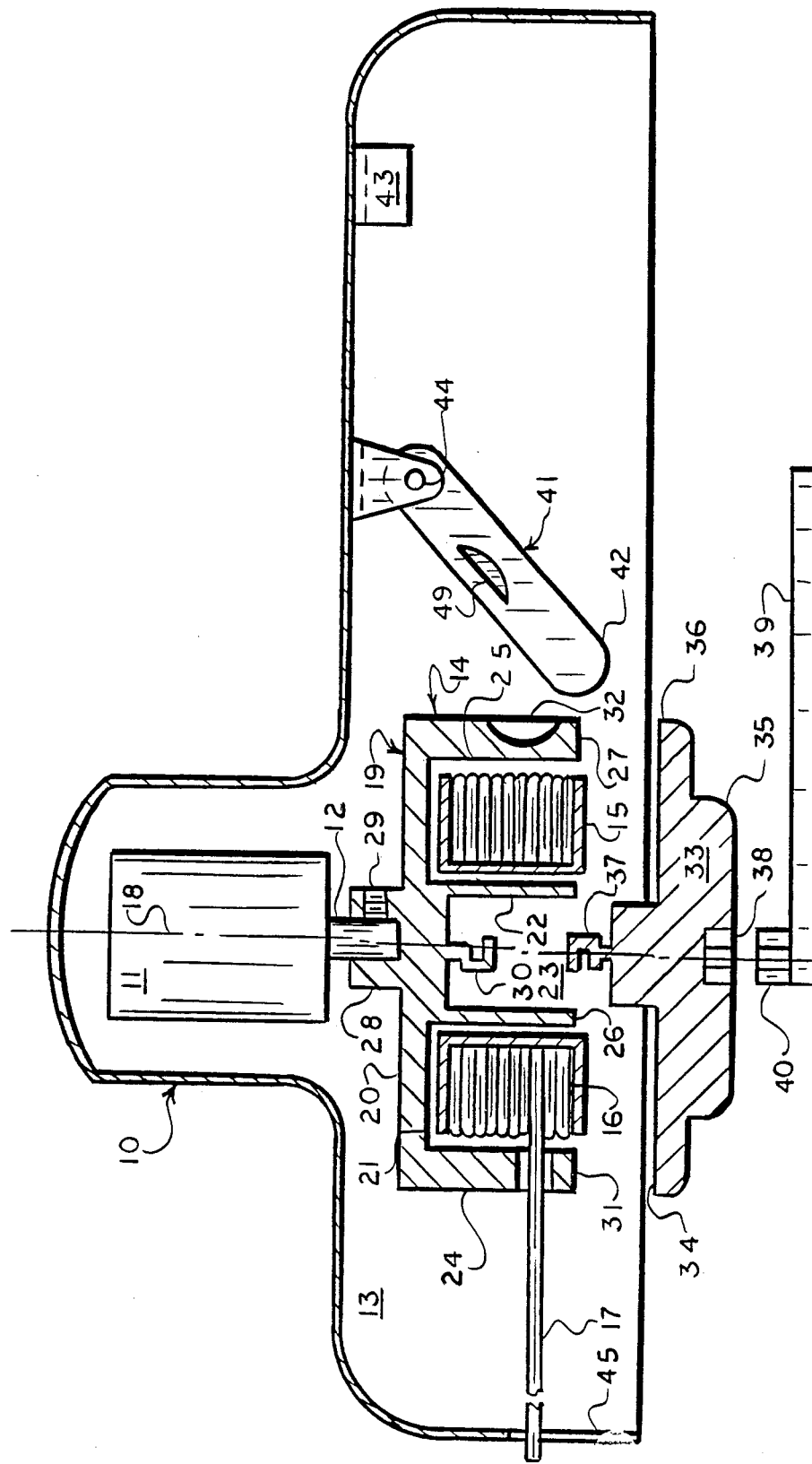
FIG. 1 is a partially exploded vertical sectional view of an embodiment of the herbage trimmer of the present invention.
Figure 2:
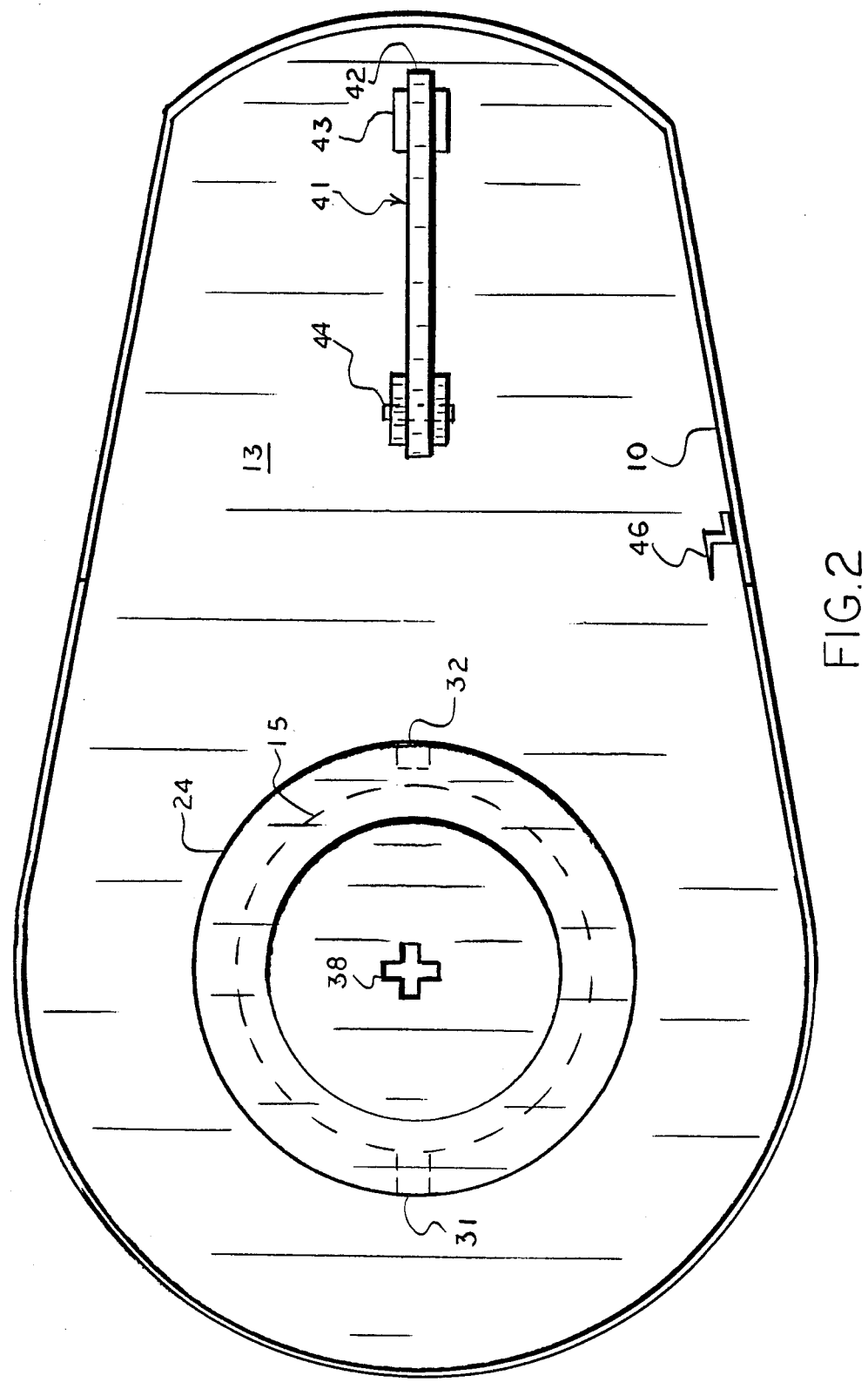
FIG. 2 is a bottom view thereof.

Referring to FIGS. 1 and 2, an embodiment of the herbage trimmer of the present invention is shown comprised of housing 10 containing at its upper extremity motor 11. Drive spindle 12, emergent from said motor, extends into downwardly opening enclosure 13 within housing 10. The lowermost extremity of spindle 12 is connected to receptacle 14 which confines spool 15 that stores a length of spirally wound cord 16. A working extremity 17 of the cord extends tangentially from the spool.

Receptacle 14 is substantially symmetrically configured about a center axis of rotation 18, and is comprised of top portion 19 having upper surface 20 and lower surface 21. A circular cylindrical inner sidewall 22, perpendicularly emergent from lower surface 21 is centered upon axis 18, and defines central space 23. A circular cylindrical outer sidewall 24, perpendicularly emergent from lower surface 21, is coaxially aligned with said inner sidewall and spaced apart therefrom to define annular space 25 within which spool 15 resides. Said inner and outer sidewalls terminate in circular perimeter edges 26 and 27, respectively, which lie in substantially coplanar disposition. Collar portion 28, associated with upper surface 20 in centered disposition about axis 18, is provided with threaded bolt 29 adapted to perpendicularly engage drive spindle 12.

First coupling means 30, emergent from lower surface 21 within central space 23 is substantially centered upon axis 18. The illustrated embodiment of the coupling means is a bayonet-type construction that achieves a securing effect by virtue of a turning movement. Means may be associated with coupling means 30, or elsewhere, to achieve a positive locking effect which thwarts unwanted turning movement that might defeat the securing effect.

A channel 31 penetrates outer sidewall 24 in a direction substantially perpendicular to axis 18. A recess 32 is formed in outer sidewall 24 at a location about 180 degrees apart from channel 31. Said recess is elongated in a direction parallel to axis 18. In general, receptacle 14 is centrifugally balanced so as to minimize vibration and wobble at the high rotational speeds imparted by the drive spindle.

A closure member 33, having top surface 34 and bottom surface 35, is disposed beneath receptacle 14. Top surface 34 is substantially flat and bounded by a circular periphery 36 whose diameter matches the diameter of outer sidewall 24. Second coupling means 37, emergent from top surface 34 in centered relationship with axis 18, is configured to rotationally engage said first coupling means. Such engagement of the coupling means causes the closure member to interlock with the receptacle. The interlocking renders spool 15 immobile with respect to said receptacle. A shaped recess 38, centered within bottom surface 35, facilitates manual rotation of closure member 33 with respect to receptacle 19, such manual rotation being achievable with wrench 39 having head 40 that insertively engages recess 38. Wrench 39 may be of ratchet construction.

Figure 3:
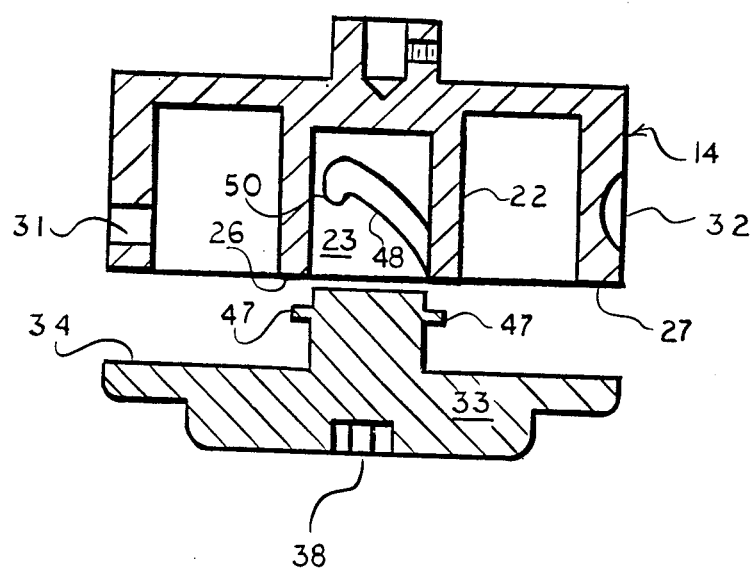
FIG. 3 is a fragmentary exploded vertical sectional view of an alternative embodiment of the present invention.

In the embodiment of FIG. 3, the first coupling means has the form of paired grooves 48 communicating with perimeter edge 26 and directed in spiral paths to upper extremities having locking means in the form of downwardly directed detents 50. The second coupling means has the form of opposed bearing posts 47 adapted to slide within grooves 48. The posts enter and exit locking detents 50 by virtue of the resilient nature of closure member 33. Accordingly, when closure member 33 is subjected to high turning torque relative to receptacle 14, the center portion of the closure member undergoes slight vertical displacement as a result of flexural stress caused by the abutment of top surface 34 with perimeter edge 27.

Rotational axis 18 is positioned in housing 10 such that the forward-most portion of working extremity 17 of the cord extends through a cut-away portion 45 in the front of the housing. Such positioning, which is standard for rotating-cord trimmers, is for reasons of safety and control of the cutting zone. As shown in FIG. 2, knife edge 46 attached to housing 10 within the rotational path of the cord automatically limits the length of working extremity 17.

Holding means in the form of bar 41 is attached by pivot pin 44 to housing 10. The free distal extremity 42 of bar 41 is adapted to swing in a vertical plane and enter recess 32 of outer sidewall 24. When engaged with said recess, rotational movement of receptacle 19 is prevented. While the receptacle is restrained in such manner, cover 33 may be rotated to the interlocked or disengaged state of the two components. When bar 41 is not being used, it is held by clips 43 attached to the underside of housing 10. An aperture or recess 49 may be disposed within bar 41 to facilitate finger-gripping thereof.

When receptacle 19 is of plastic construction, metal fillets which impart strength and reduce wear may be provided within channel 31, recess 32 and collar portion 28.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In a rotary cord herbage trimmer comprising a head member having a housing which defines a downwardly opening enclosure, a motor mounted adjacent the upper extremity of the housing, and a drive spindle emergent from said motor and directed downwardly into said enclosure, the improvement comprising:

(a) a spool-accommodating receptacle symmetrically configured about a center axis of rotation and comprised of a circular cylindrical inner sidewall axially centered upon said axis and defining a central space, a circular cylindrical outer sidewall coaxially aligned with said inner sidewall and defining therewith an annular space adapted to confine a cord-carrying spool, a top portion having an upper surface, and a lower surface from which said sidewalls are perpendicularly emergent, said sidewalls terminating in circular perimeter edges lying in substantially coplanar disposition, first coupling means disposed within said central space, a channel penetrating said outer sidewall in a direction substantially perpendicular to said axis, a recess located in said outer sidewall and elongated in a direction parallel to said axis, and means associated with said upper surface for attaching the receptacle to said spindle in coaxial alignment therewith and within said enclosure, (b) a closure member symmetrically configured about a center axis, having a bottom surface, and a top surface laterally bounded by a circular periphery having a diameter substantially equal to the diameter of said outer sidewall, second coupling means associated with said top surface and configured to rotationally engage said first coupling means, causing said closure member to interlock with said receptacle in coaxial alignment with said axis of rotation while rendering said spool immobile with respect to said receptacle, and means associated with said bottom surface to facilitate manual rotation of said closure member with respect to said receptacle to achieve said interlocking, and (c) holding means pivotably attached to said housing and adapted to releasibly engage said recess for the purpose of preventing rotation of said receptacle while said closure member is manually rotated to achieve or release said interlocking.

2. The trimmer of claim 1 wherein said holding means is a bar.

* * * * *